United States Patent [19]

Risse

[11] 3,745,753

[45] July 17, 1973

[54] AIR CLEANER
[75] Inventor: Willis H. Risse, Flossmoor, Ill.
[73] Assignee: United Filtration Corporation, Chicago, Ill.
[22] Filed: Apr. 27, 1970
[21] Appl. No.: 32,203

[52] U.S. Cl.............. 55/481, 55/337, 55/399, 55/502, 55/504, 55/507, 55/DIG. 28
[51] Int. Cl............................. B01d 45/00
[58] Field of Search.............. 55/399, 459, 429, 55/337, 481, 482, DIG. 28, 502, 504, 507

[56] References Cited
UNITED STATES PATENTS

| 770,582 | 9/1904 | Hollingsworth | 55/459 X |
|---|---|---|---|
| 3,672,130 | 6/1972 | Sullivan et al. | 55/481 X |
| 3,423,909 | 1/1969 | Bennett et al. | 55/498 |
| 3,584,439 | 6/1971 | Gronholz | 55/337 |
| 24,551 | 6/1859 | Fontain | 55/429 |
| 418,836 | 1/1890 | Allington | 55/399 |
| 468,935 | 2/1892 | Morse | 55/399 |
| 2,979,159 | 4/1961 | Pritchard et al. | 55/482 |
| 3,048,959 | 8/1962 | Lowther | 55/399 X |
| 3,146,081 | 8/1964 | Emdy | 55/429 X |
| 3,357,163 | 12/1967 | Burger et al. | 55/385 |

Primary Examiner—Robert L. Lindsay, Jr.
Attorney—Parker, Plyer & McEachran

[57] ABSTRACT

An air cleaning device of the so-called all dry type for use in cleaning the air for internal combustion engines, air compressors and the like with a unitary type housing which is generally cylindrical in nature enclosing a generally cylindrical dry filter element with a dirty air inlet and a clean air outlet in which the housing is indented opposite the clean air inlet to prevent dirt from orbiting, the housing section is made from two halves which are of generally equal size and length and of similar shape so that they can be crimped together at their abutting edges, a unitary distortable seal is used on the filter element itself to simultaneously seal and pilot the element, a bail mechanism is used to simultaneously clamp the closure in place and also apply an axial thrust to the filter element, and the housing has reduced portions at each end to properly center the filter element.

6 Claims, 11 Drawing Figures

INVENTOR.
Willis H. Risse
BY Parker, Carter & Markey
Attorneys.

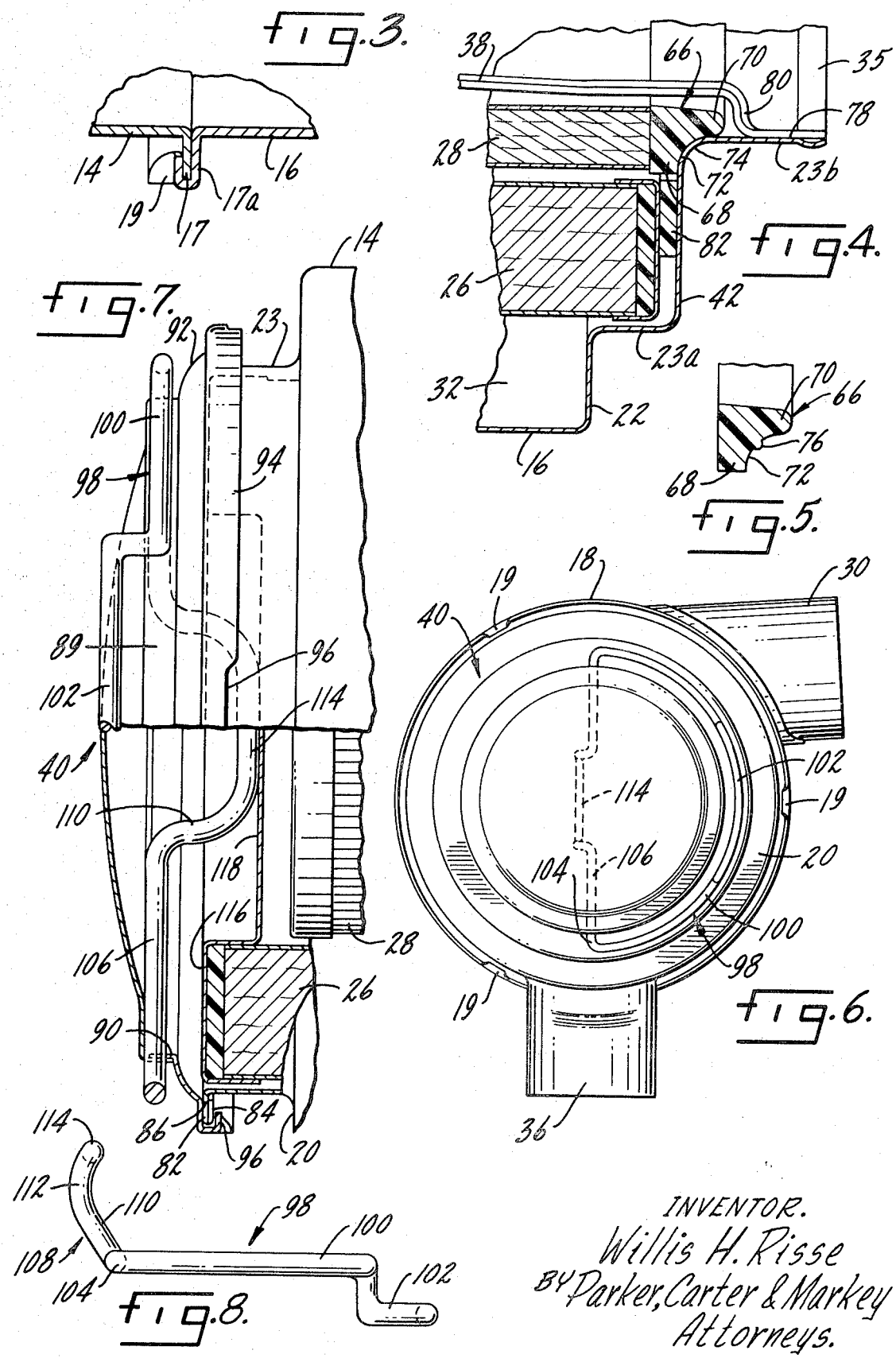

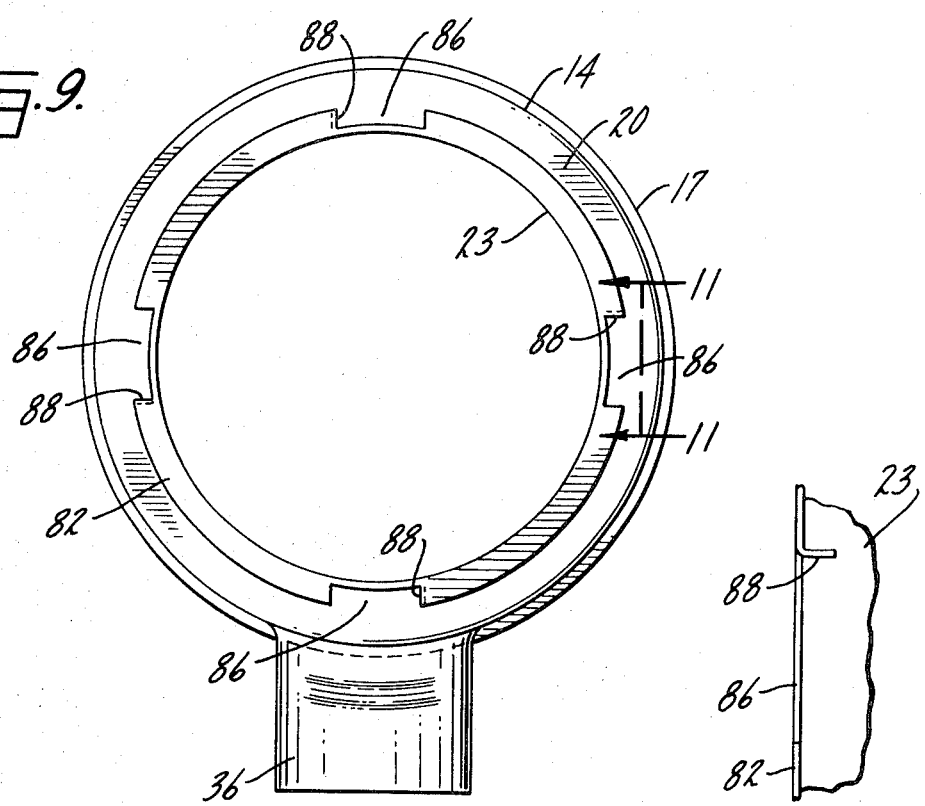
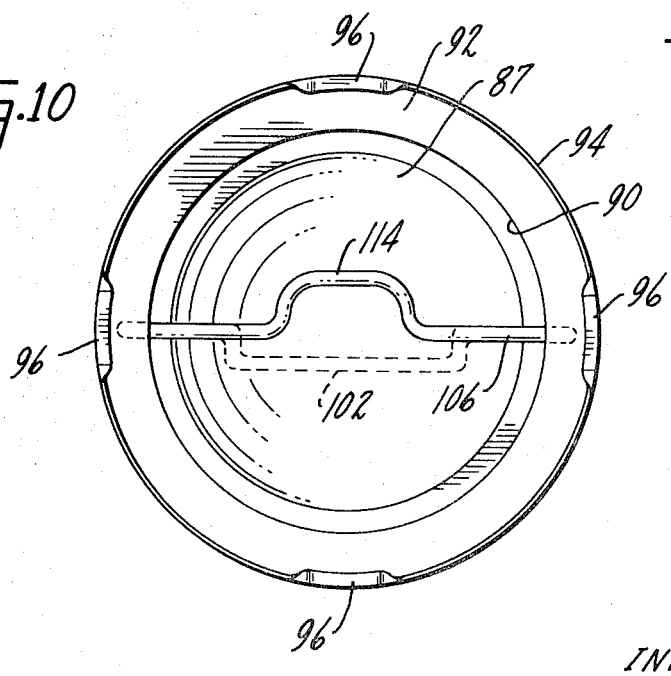

3,745,753

AIR CLEANER

SUMMARY OF THE INVENTION

This invention is concerned with an all dry air cleaner and is specifically concerned with the housing structure of a cylindrical nature which encloses a generally annular filter element.

A primary object of the invention is an all dry air cleaner with a housing formation that sets up a helical swirl of the air inside the housing.

Another object is a housing structure for an all dry filter element which is substantially less expensive than prior units.

Another object is an all dry filter element or unit which can be stamped.

Another object is an all dry air cleaner of the above tyep which requires fewer parts.

Another object is an all dry air cleaner of the above type which requires less welding.

Another object is an all dry air cleaner which more accurately sets up a swirl of dirty air inside the air cleaner around the annular filter element.

Another object is a ramp structure for an all dry air cleaner that prevents any dirt from orbiting at one end of the cylindrical housing.

Another object is an all dry air cleaner with a generally cylindrical outer housing constructed so that the inlet for dirty air may be oriented in any direction through a full 360° thereby making the unit adaptable for a large number of applications or uses without requiring separate tooling.

Another object is an all dry air cleaner housing made in two portions which can be identical draws, brought together and clinched.

Another object is a housing for an all dry air cleaner which, without any alteration, can be used in a far greater number of applications.

Another object is a filter element for an all dry air cleaner with a double duty seal at one end constructed for both sealing and piloting when the element is mounted in an air cleaner.

Another object is a seal for a filter element for use in an all dry air cleaner which provides an accurate sealing and piloting function.

Another object is a closure mechanism for an all dry air cleaner which provides for quick opening and closing and a combination closing and thrust to seat and seal the filter element firmly and securely in the housing.

Another object is a closure mechanism of the above type that allows a minimum of air flow and very little, if any, entry of water and mud.

Other objects will appear from time to time in the ensuing specification and drawings.

BRIEF DESCRIPTION OF THE DRAWINGS

FIG. 3 is a section along line 3—3 of FIG. 1 on an enlarged scale;

FIG. 4 is an enlarged sectional view of a part of the housing, filter element, and seals from FIG. 1;

FIG. 5 is a detail, the gasket or seal, of FIG. 4;

FIG. 6 is an end view taken from the left end of FIG. 1;

FIG. 7 is an enlarged view, partly in section, of the closure and bale mechanism on the left in FIG. 1;

FIG. 8 is a side view of the bale itself;

FIG. 9 is an end view, like FIG. 5, but of the left half of the housing and with the end closure or cap removed;

FIG. 10 is an inside view of the cap or end closure; and

FIG. 11 is a section along line 11—11 of FIG. 9.

DESCRIPTION OF THE PREFERRED EMBODIMENT

Figure 1:
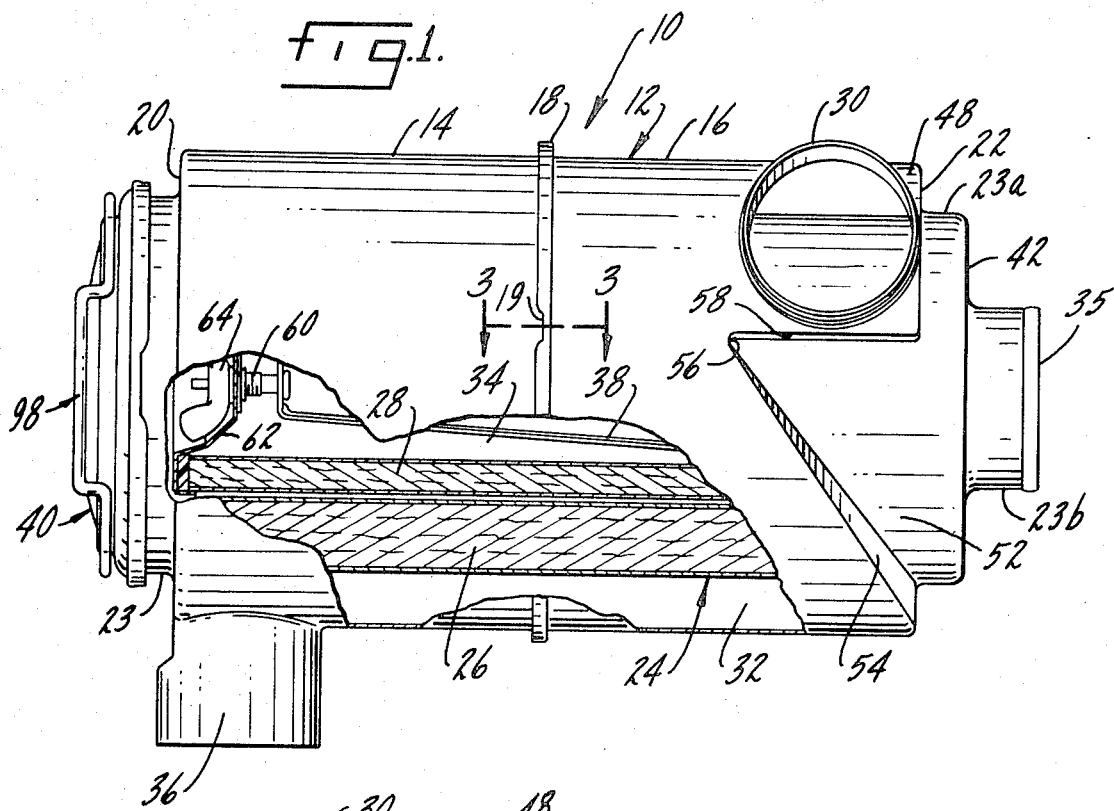
FIG. 1 is a side view, partly in section, of an all dry air cleaner.

In the drawings an air cleaner has been indicated generally at 10 and it will be noted that the exterior of the housing 12 is generally cylindrical and is composed basically of two sections or halves 14 and 16 brought together and suitably connected by crimping or the like, but it might be otherwise.

In FIG. 3, the abutting edges of the two halves are shown enlarged and in cross section. Each half may have an outstanding flange, as at 17 and 17a. One half, for example 16, in addition to having an outstanding flange at the abutting edges, also has a cylindrical skirt 18 which may be suitably crimped, as at 19. The entire peripheral edge of skirt 18 is not crimped, but rather individual sections or areas are crimped at spaced locations. For example, three such crimps, about 180° apart, works quite well. But more or less may be used. In fact, the entire skirt 18 may be fully rolled over and crimped, if desired.

Each end of the generally cylindrical housing may be considered to have an annular offset or wall, as at 20 and 22, followed by a short cylindrical portion 23 and 23a. The housing half on the right in FIG. 1 is then closed by an outlet formation 23b while the one on the left side has a removable closure, to be explained in detail hereinafter. It will be noted that the two halves 14 and 16 thus resemble each other and, in fact, can be made on a single set of dies. Each thereafter can be processed in a manner explained hereinafter. The point is that only one set of dies need to be used to draw the two basic halves and any two halves can be brought together later after suitable additional processing.

Inside the cylindrical housing, a generally annular filter element 24 is positioned which is shown as including an outer element 26 and an inner element or safety 28, although it could be a single unit.

Figure 2:
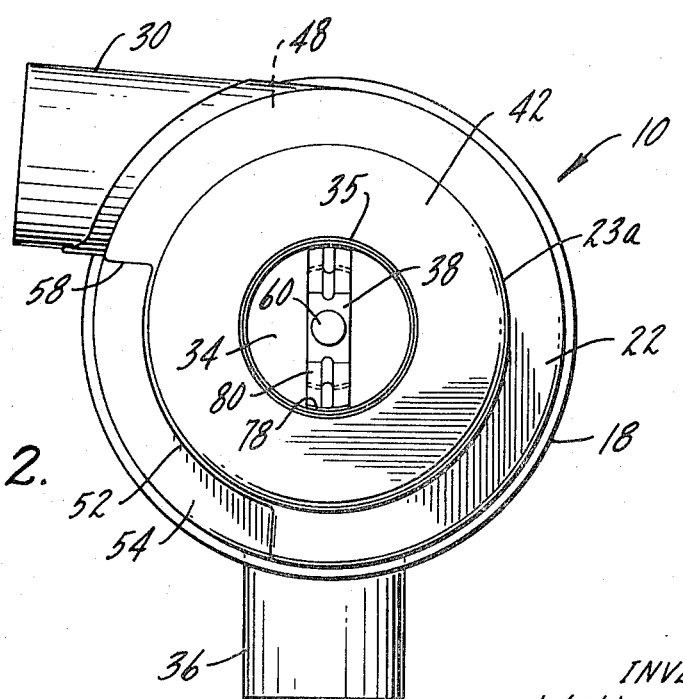
FIG. 2 is an end view taken from the right end of FIG. 1.

An inlet 30, suitably arranged for admitting dirty air to the housing, is mounted on the exterior or side wall and, as shown in FIG. 2, is tangentially disposed, or approximately so, so that the air entering the housing will immediately go into a swirl. The inlet 30 is disposed directly at or adjacent one end of the housing, in this case the end 22, so that the entering air will have a tendency to go into a helical swirl and move from right to left in FIG. 1. The entering air then swirls in the space 32 between the outside of the filter element 24 and the inside of the housing wall 12 and the air will be drawn through the filter element to the axial center or space 34 in the filter element itself and discharged through a generally axially disposed clean air outlet 35. The rotary or swirling motion of the air in the housing around the filter element tends to centrifuge the dust particles to the outside and a discharge port is provided in the side wall, at or adjacent the other end, with a dirt discharge or adapter 36 covering it for separating the dirt from the clean air. The dirt and dust discharge at 36 may have a dust unloader such as shown in prior U.S. Pat. No. 3,319,404, issued May 14, 1967, assigned to this assignee. A bale or center holding mechanism 38 may be used to releasably hold the filter element 24 in the housing and one end, for example 20, of the housing may be arranged to be opened, as by a closure 40, so that from time to time and when appropriate the filter element itself may be removed, cleaned and repreplaced or thrown away and a new one inserted.

In the past a certain amount of dirt has gotten into the corner of the housing adjacent the inlet and orbited without moving helically toward the dust port. For example, in FIG. 1 a certain amount of dirt has gotten into the corner 48 inside the housing and has merely orbited around against the offset or annular wall 22 without moving to the left to the dust port. This can be undesirable since this dust will circulate for some time, will impinge against the inside of the housing and will break up and form quite small particles of dust which will penetrate the filter element 24.

In the past this has been taken care of by putting a dust ramp inside of the housing to force this material out of orbit and into the air helix around the filter element, as shown in U.S. Pat. No. 3,048,959, issued Aug. 14, 1962 and assigned to the present assignee. But this has involved an extra piece, has required welding or other attachment, and has been expensive, difficult to make, and undesirable.

In FIG. 1 a baffle or formation 52 is formed in the housing which may be considered to be a helical formation. One wall 54 may be helically disposed so that the air coming around from the inlet, clockwise in FIG. 2, will strike this baffle or helical wall 54 and will move off to the left. The angle of the wall 54 may be predetermined so that the pitch of the helix is at whatever is desired for the dust to arrive at the dust port after the desired number of turns or a portion of a turn. The wall 54 may terminate at any suitable point 56 with a return wall 58, axially disposed or otherwise, to the annular wall 22 so that, in effect, the cylindrical portion 23a extends into what would otherwise be the housing itself in the form of a depression which suitably masks or guards the inlet and causes the helical deflection away from the inlet for the entering air and dirt that might otherwise tend to orbit.

The indentation or formation 52 may be applied to one half after it is initially formed by the dies referred to hereinabove in a separate operation.

On the left side of FIG. 1, the bale 38 is shown as having a threaded stud 60 on the left end thereof which projects through an opening in an end wall 62 of the inner filter element or safety to accept a wing nut 64. By turning down on the wing nut, the inner filter element 26 may be fully and firmly seated and sealed in the housing.

The right hand end of the inner filter element or safety 28 is shown in detail in FIG. 4. The element itself may be pleated paper of a conventional type, and a gasket 66 closes the end thereof which may take on the character of or be a plastisol with the ends of the pleats embedded in it. The gasket or seal or end plastisol 66 is of a special form and structure and includes an annular outer portion 68 which serves primarily as a seal and an inner projecting portion or pilot 70 with the outer surface between the two being on a radius 72 which conforms more or less to the bend or radius 74 in the end wall between the generally cylindrical clean air outlet 35 and the annular flat portion 42 of the end wall. The projecting pilot portion 70 is dimensioned so that it will fit in the cylindrical outlet 35 and is thus arranged to guide the inner filter element to its proper seating. In fact, the pilot should extend sufficiently beyond the main portion of the seal such that if it is misaligned and hits the flat wall 42, the closure or holding arrangement at the other end will not properly close or seal. The radius or curve 72 of the plastisol may have a projecting bead 76, shown in FIG. 5, which extends completely around the filter element and is constructed to contact the radius 74 of the housing first as the unit is installed. Thus the load of the bale and holding arrangement, shown in FIG. 1, or whatever is used, is first applied to compress bead 76 against the radius of the housing before the full radius of the plastisol seats against the housing radius. The result is that the primary sealing is done at the bead with the other areas of contact, after the bead is compressed, doing secondary sealing. This insures that a complete seal is obtained all the way around. Without the bead and assuming that the radii match, if the unit gets slightly misaligned, even though the pilot 70 enters the outlet 35, the loading from the securing mechanism 38–64 will be taken by those portions of contact. To make sure that the noncontacting areas do, in fact, contact, the operator will have to exert a tremendous amount of force to compress the contacting areas. But with the bead 76 a seal is obtained all the way around without tremendous loading.

As shown in FIG. 4, the bale 38 may be suitably welded or otherwise connected to the outlet 35 as at 78 and an offset 80 is provided in the bale so that the pilot portion 70 of the seal may properly socket into the outlet.

The outer filter element 26 in FIG. 4 may be of a conventional type and may have a suitable seal 82 mounted or held on its end so as to engage and seal against the wall portion 42 independently of the mounting and sealing arrangement for the inner filter element. It will be understood that in this form the outer and inner filter elements may be completely separate, the outer filter element 26 being the primary filter element and the inner element 28 being basically a safety or reserve element to protect the engine, or whatever the air cleaner is used with, if the outer element is damaged, for example during cleaning and replacement. In this form, the inner filter element may be considered to be semipermanently mounted and only the outer element 26 is normally removed, cleaned and replaced from time to time through the end closure 40 in FIG. 1 although, of course, the inner element or safety is removable.

The closure arrangement 40 may be in the form of a cap which is removably mounted on the end 23 of the filter element. Cylindrical portion 23 may be flared outwardly into a flange 82, FIG. 7, and, possibly, doubled back on itself at 84. At spaced points on the thus formed flange, notches may be cut as at 86 in FIG. 9, four being shown, but it may be more or less. Some of the material along one edge of the notch may be left in place and bent rearwardly, as at 88 in FIG. 11, to form a stop, shown in this case in FIG. 9 as on the left or counterclockwise edge of each notch. The flange 82 is spaced axially from the end wall 20, shown in FIG. 7, by a sufficient distance such that a closure cap may be mounted and removed.

The cap may take the form of a dome 87 with a cylindrical edge 89 mounted around and welded or otherwise connected to a matching cylindrical part 90 on a ring part 92 which is shaped inwardly to a generally cylindrical skirt 94. At suitable locations the skirt is folded inwardly, as at 96 in FIG. 10, with each such fold extending a certain peripheral distance. Four such folds or tabs are shown in FIG. 10, but it should be understood more or less may be used. These folds or tabs match the notches 86 in the housing flange 82 so that when the cap is placed on the cylindrical portion 23, the tabs 96 will pass through the notches 86. As shown at the bottom of FIG. 7, the tab is spaced sufficiently from the inner portions of the ring 92 such that the width of the flange 82–84 will fit between them. When the tabs are passed through the notches 86, the cap may then be rotated which will put the tabs behind the flange 82,84. The stop at 88 on one edge of each of the notches 86 will allow the cap to be turned only one way, clockwise in FIG. 9. The cap may be turned something just short of 90° until the tabs hit the stops 88 at the next adjacent slot.

Matching notches, 180° apart, are provided in the matching flanges 89 and 90 of the cap to define holes so that a bale, indicated generally at 98, may be mounted or held in the cap. The bale may take the form of a wire, possibly in one or two pieces, which is appropriately bent, with the legs thereof passed through the openings, referred to above, until the ends of the wire or wires come together. The bale includes the outside part 100 which extends approximately 180° with an axial offset 102 generally between the ends thereof which serves as a handle. The legs then turn in at each end, as at 104, and pass through the openings in the cap. An inside part 106 includes two portions that extend radially inwardly to an offset 108 generally in the center. The offset 108 extends first forwardly as at 110 (FIG. 8) and then through a bend into a rearward portion 112 to a centerpiece 114. In FIG. 8 it will be noted that the centerpiece 114 rises to one side of the center of rotation of the bale. For example, consider the point 104, which is the bend or pivot at each end. The crosspiece 114 lies to the left of a vertical or axis through the pivot 104.

The outer filter element 26 in FIG. 7, when fully seated in the housing, has its left end in the cylindrical portion 23. The left end of the filter element is closed by an end wall or cap 116 which has a center depression 118. When the bale or handle is rotated after the cap has been put on the housing and turned so that the joint is interlocked, the end portion 108 will rotate, counterclockwise in FIG. 8, until the crosspiece 114 contacts the center offset 118 in the filter element, in FIG. 7. The direction of rotation of the bale is such that the outside portion 100 is tending to merge into the contour of the cap in the position shown in FIGS. 6 and 7. The dimensioning is such that center part 114 is still to the right of center in FIG. 8 when contact is made. Further movement of the handle to compress it flat on and around the outside of the cap will thrust the filter element 26 to the right, in FIG. 1, compressing the seal 82, FIG. 4, against the other end wall. There is sufficient "give" or resiliency in all of the parts and components such that 114 will move overcenter to the opposite side and the resiliency, say, in the seal 82 as well as in the housing will lock the handle in place under load, since it has passed overcenter.

The use, operation and function of the invention are as follows:

The invention is concerned with an all dry air cleaner in which a helical swirl of air and dirt is set up inside of a generally cylindrical housing with clean air being inside of a generally cylindrical housing with clean air being drawn from the center of the swirl through a filter element to a suitable outlet. The dirt is centrifuged to the outside as it moves through its helical swirl inside the housing down to the other end where it is discharged through a dust unloader device indicated generally at 36.

To prevent dirt from bing entrained in static orbit at the inlet end, a helical depression is provided which forces all dirt and air to move at a predetermined lead toward the dust port. This will prevent any dirt from endlessly orbiting against the end wall out of the mainstream and breaking up into microscopic particles which, eventually, will pass through the filter element and move into the engine.

Forming the ramp as a depression has the advantage that no separate pieces are required. Also, welding or otherwise connecting any parts and pieces is avoided. Further, the depression may be incorporated directly into the housing when it is stamped or otherwise formed. Positioning a separate piece in the housing and welding or otherwise suitably connecting it in place is very inaccurate and depends heavily upon the skill of assembly line employees. Stamping it in directly, as shown and explained hereinabove, has the advantage that accuracy can be built into the stamping dies and the ramp and depression can be quite accurately quite located, and will have an accurate angle and a quite definite axial extent.

The particular positioning of the inlet in relation to the dust port can be varied a full 360° which makes for a more universal air cleaner.

The closure arrangement performs the function of providing quick and ready access to the filter element. The closure itself thrusts the filter elements against the opposite wall to effect a good seal. The bayonet type joint between the cap and the housing is mechanically sound and inexpensive. The bale arrangement in the closure insures a good seal for the filter element at the opposite end and a tight mounting for the cap or closure at the open end in addition to quick access to the filter element. The cap or closure overlaps the open end 23 so that water and mud will not enter the unit. While there may be a small amount of air leakage around the cap since the connection is not air tight or sealed, water and mud will be excluded which is the most important. In use air cleaners of this type can be exposed to fairly rough service. And it is important that the inside of the air cleaner and particularly the filter element itself stay as dry as possible. The overcenter bale arrangement that engages the filter element insures a good seal at the other end. Since there may be a substantial amount of tension in the unit, the offset part 102 in the outer bale or handle is something the operator can get hold of, but, at the same time, is folded in snugly against the side of the cap and will not snag passing branches or projections. Even though there may be a little leakage around the cap, this doesn't matter since the majority of the air will go through the inlet 30 at the opposite end since air will seek the point of least resistance.

While a double filter element, the main outer unit and the inner safety, has been shown, each independent of the other, it should be understood that the particular closure shown may be used in a unit with a single filter element and no safety. This is also true of other features.

Bringing the two halves of the housing together with a clinch, or any other suitable simple joint, between their abutting edges has the advantage, first, that the two halves can be made in a single draw operation. Another and quite important advantage is that the half with the dirty air inlet can be oriented in any direction before the crimp is made. It is preferable that the dust discharge 36 always be down, or approximately so. In a particular installation or application due to interference or other circumstances, it may be desirable for fewer models and a great inlet 30 to project in a particular direction, for example straight up. This can be easily and simply done by properly orienting it before the clinch is made at 19. The next application might want the inlet to be directed to either one side or the other or straight down or anywhere throughout 360°. And this could easily be accomplished by properly orienting the housing half 16 before the connection is made at 19. In effect, the inlet can be rotated to any angle in relation to the other end of the cleaner without additional tooling being required. This means and saving in tooling and inventory.

The combination seal and pilot for the filter element, as shown in detail in FIG. 4, can be applied to a regular filter element as well as a safety. So the showing in FIG. 4 applied to the safety element should not be taken to indicate that this type of seal and pilot is only applicable to a safety element or to a double element. It might be used with a single unit. The projecting or piloting portion that fits into the outlet tube is contoured so that in addition to providing a good seal, it also provides a guide for piloting and enables a man to find the outlet opening and to know when the element is fully and properly seated, otherwise the closure at the other end won't fit. This gives you a failsafe to make sure that the filter is properly seated. The dimensioning should be such that the parts at the other end, be it the closure arrangement in FIG. 7 or the stud and wing nut in FIG. 1, won't come together unless the pilot is accurately and fully positioned in the outlet. The annular rib 76 in FIG. 5 provides a good seal without requiring an excessive thrust and the positioning of this rib in the radius between the main sealing portion and the pilot has the advantage of contact with a domed or concaved radius, as at 74 in the housing.

While the preferred form and several variations have been suggested, it should be understood that suitable additional modifications, changes, substitutions and alterations may be made without departing from the invention's fundamental theme.

I claim:

1. In an air cleaner assembly for use with an internal combustion engine or the like, a generally cylindrical housing having an inlet for dirty air, a clean air outlet adapted to be connected to the intake of an internal combustion engine, a generally cylindrical annular filter element in the housing with its interior in communication with the clean air outlet and its exterior in communication with the dirty air inlet, an axially disposed opening on one end of the housing to provide for insertion of clean filter elements and for withdrawal of dirty ones, a removable closure on the opening, and an over center bale bale mechanism on the closure constructed, upon actuation thereof, to simultaneously clamp the closure in place on the opening and to apply an axial thrust to the filter element to firmly seat it in the housing said bale mechanism is mounted on the closure and is removable therewith, the closure and bale mechanism, as a unit, being separate from the housing and filter element, but mountable on and removable from the axially disposed opening in the housing.

2. The structure of claim 1 further characterized in that the peripheral edge of the closure is provided with a skirt that overlies the exterior of the housing at the axial opening such that when the closure is in place on the opening, the skirt will prevent the entry of water and foreign material into the housing.

3. The structure of claim 1 further characterized by and including a bayonet joint between the closure and housing, and including a plurality of slots on one and a like number of interfitting tags on the other.

4. The structure of claim 1 further characterized in that the bale mechanism includes an outer arcuate portion of about 180° with each end thereof extending through and pivoting in openings in the closure, the ends being interconnected by an inner portion lying inside the closure and extending diametrically across it with an offset formation generally in the center thereof constructed, upon pivoting closure of the outer portion to project inwardly and engage a filter element in the housing so as to apply an axial thrust to it.

5. The structure of claim 4 further characterzed in that the offset portion on the inner part of the bale is constructed to move overcenter across the axis of the housing when the outer circumferential portion is folded in flush with the exterior of the closure so that unlocking the bale, by reverse pivoting of the outer portion, will be resisted by the overcenter position of the offset inner portion.

6. The structure of claim 3 in which the slots are in the peripheral edge of the opening in the housing and the tabs are on the closure.

* * * * *